UNITED STATES PATENT OFFICE.

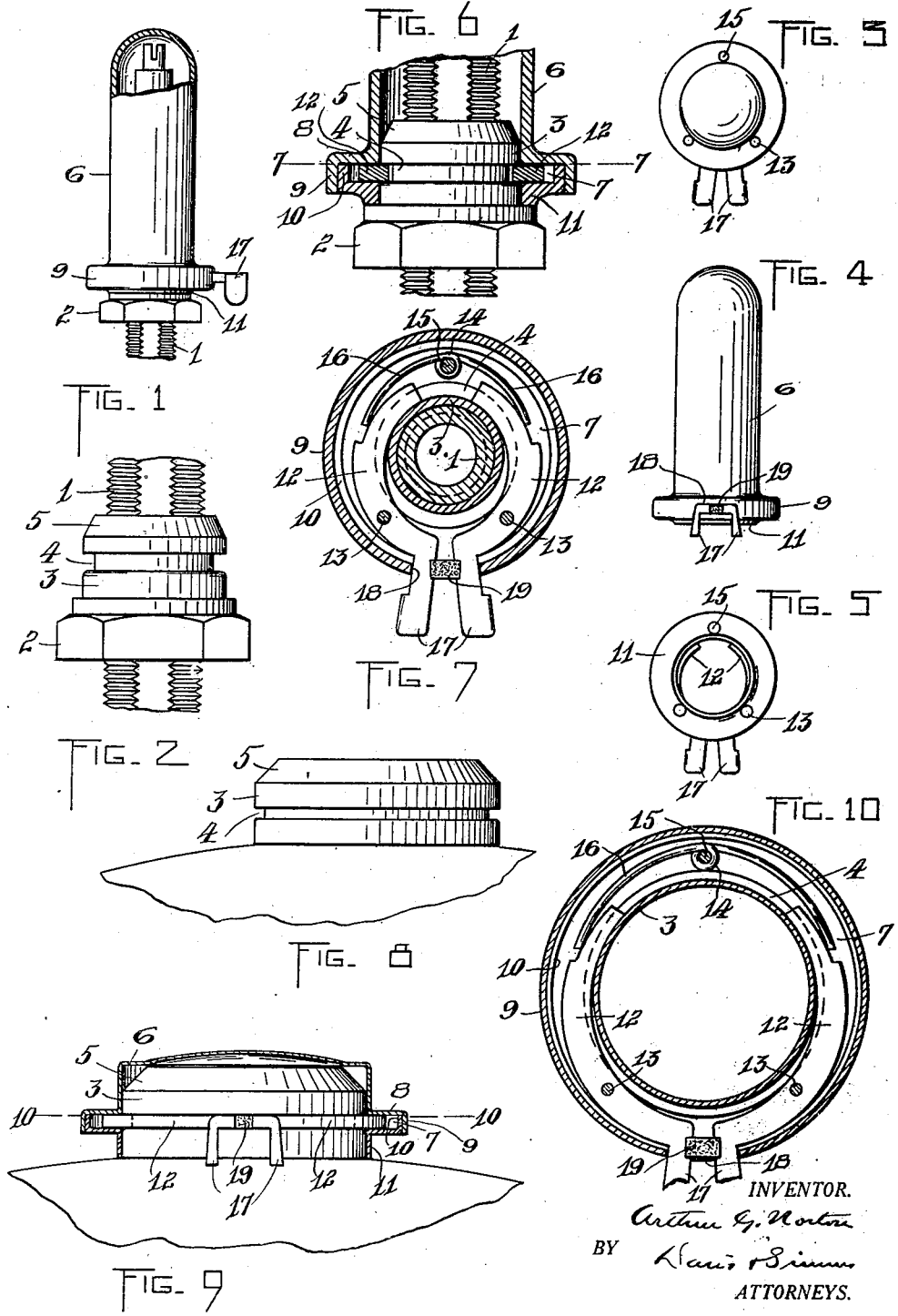

ARTHUR G. NORTON, OF ROCHESTER, NEW YORK.

DETACHABLE CAP.

1,373,092.  Specification of Letters Patent.  Patented Mar. 29, 1921.

Application filed December 26, 1919. Serial No. 347,255.

*To all whom it may concern:*

Be it known that I, ARTHUR G. NORTON, a citizen of the United States, and resident of Rochester, in the county of Monroe and State of New York, have invented certain new and useful Improvements in Detachable Caps, of which the following is a specification.

The present invention relates to detachable caps for objects of various kinds, being in this instance illustrated as embodied in a dust cap for tire valves and as a cap for automobile radiators or other receptacles. An object of this invention is to provide a cap which may be quickly applied to and removed from the part which it is to cover and while upon said part, being effectively secured in place. Another object of the invention is to provide a retaining means on the cap which will yield upon the fitting of the cap to the part which it is to cover and automatically enter into interlocking engagement with such part. A further object of the invention is to provide a retaining means for the cap arranged so as to exclude dust from the interior of the cap. A still further object of the invention is to provide means about the valve stem of an automobile tire with which yielding means on the valve cap may interlock.

To these and other ends the invention consists of certain parts and combinations of parts, all of which will be hereinafter described, the novel features being pointed out in the appended claims.

In the drawings:

Figure 1 is a side view of one embodiment of the invention designed for covering a tire valve, parts being in section;

Fig. 2 is an enlarged detail view showing the nut applied to the tire valve;

Fig. 3 is a view of the closed end of the cap;

Fig. 4 is a view in elevation of the cap shown in Fig. 1;

Fig. 5 is a view of the open end of the cap showing the retaining devices in position to engage the valve stem;

Fig. 6 is a view showing the nut of Fig. 1 in side elevation with a fragment of the cap connected to the nut, the cap being shown in section;

Fig. 7 is a section on the line 7—7, Fig. 6;

Fig. 8 is a fragment of an automobile radiator modified to correspond with the present invention;

Fig. 9 shows the invention embodied in a cap for an automobile radiator, a fragment of the radiator being shown in side elevation and the cap being shown in section; and Fig. 10 is a section on the line 10, 10, Fig. 9.

Referring first to the embodiment of the invention illustrated in Figs. 1 to 7, 1 indicates the valve stem of a pneumatic tire or part to be covered which in this instance, is surrounded by a nut 2, said nut having a cylindrical portion 3 formed with an annular groove 4 and with a tapered portion 5 at its upper end. For fitting over the cylindrical portion 3 and the valve stem 1 is a cap 6 which, in this instance, is formed with an annular channel 7 constructed preferably by making the cap 6 of two pieces, one of said pieces being bent outwardly at 8 and thence axially at 9 to provide an annular flange in which a flange 10 on the other piece 11 is received.

The retaining means is mounted in this instance, in this channel and comprises preferably two retaining devices 12 pivoted between their ends at 13 on axes which extend in the direction of the axis of the cap. A single spring may act on these retaining devices to move them inwardly in order to yieldingly engage with the anchoring means. This spring, in this instance, is coiled at 14 about a pin 15 in the channel 7 and has two oppositely extending spring arms 16 for engaging with the two retaining devices 12. To the end of providing for the manual operation of these retaining devices, each of them may be provided with a handle or operating portion 17 which may be extended through an opening 18 in the channel portion of the cap. With the purpose in view of preventing the entrance of dust between the two operating portions of the retaining devices, a rubber piece or member 19 is positioned between such operating portions so as to close the opening in the channel when the retaining devices are interlocked with the anchoring means.

In the use of this form of the invention, the cap is fitted over the stem until the retaining devices coöperate with the tapered portion which moves them against the action of the spring 14 so that when the annular groove 4 is reached, they will spring into said groove under the action of the spring and cause the cap to interlock with the anchoring nut on the valve stem. In the embodiment shown in Figs. 8 to 10 the parts are the same, except that the anchoring means is not in the form of a nut, but is provided about the filling opening of a radiator of an automobile. Like reference characters used in this form of the invention will refer to like or similar parts in the embodiment of the invention shown in Figs. 1 to 7.

From the foregoing it will be seen that there has been provided a cap with an interior annular channel carrying means, preferably yielding, to interlock with the portion received within the cap. This yielding means may be manually operable and comprises retainers pivoted about axes extending in the direction of the axis of the cap so that the tendency of the retainers to swing on the axes while the cap is in position is eliminated. The cap is so constructed that dust is excluded from the interior thereof. The anchoring means is of novel form and permits yielding means on the cap to readily interlock therewith. This anchoring means coöperates with the yielding means to cause the latter to enter a groove in such anchoring means. The anchoring means may be arranged about a tire valve and may be in the form of a nut formed with a tapered portion and a groove, or it may be in the form of a separate sleeve with a groove and a nut holding the sleeve in position and tapered to cause the yielding means to enter the groove.

What I claim as my invention and desire to secure by Letters Patent is:

1. The combination with a part to be covered, of a cap therefor having a pair of retainers pivoted on the cap on axes extending in the direction of the axis of the cap and having operating portions situated in proximity to each other and a single spring acting on both of said retainers.

2. The combination with a part to be covered, of a cap therefor having an interior annular channel, two retainers pivoted between their ends in the channel about axes extending in the direction of the axis of the cap and having operating portions situated in proximity to each other, and a single spring anchored in the channel between the opposed ends of the retainers and having oppositely extending arms engaging the retainers to hold the latter in the retaining portions.

3. The combination with a part to be covered, of a cap therefor having an interior annular channel, two retainers pivoted between their ends in the channel about axes extending in the direction of the axis of the cap and having operating portions situated in proximity to each other, a single spring anchored in the channel between the opposed ends of the retainers and having oppositely extending arms engaging the retainers to hold the latter in the retaining portions, and a yielding dust excluder arranged between the other two ends of the retainers.

4. The combination with a part to be covered, of a cap therefor having an interior annular channel provided with an opening in its wall, two retainers mounted in the channel and having operating portions extending through the opening, and a yielding dust excluder arranged between the two retainers at the opening.

5. The combination with a screw threaded valve stem, of anchoring means surrounding said stem, a cap adapted to fit over said anchoring means and having interiorly arranged yielding means for coöperating with the exterior of the anchoring means, and means manually operable from the exterior of the cap for expanding said yielding means to permit the removal of the cap.

6. The combination with a part to be covered having an external cylindrically formed portion formed with an external circumferential groove, and an external tapered portion, of a cap fitting over said cylindrically formed portion and having interiorly arranged yielding means coöperating with said tapered portion to enter the external groove, and means manually operable from the exterior of the cap for expanding said yielding means to permit the removal of the cap.

ARTHUR G. NORTON.